(12) United States Patent
Saeki et al.

(10) Patent No.: US 12,717,298 B2
(45) Date of Patent: Aug. 25, 2026

(54) I/O UNIT AND COMMUNICATION SYSTEM

(71) Applicant: FANUC CORPORATION, Minamitsuru-gun (JP)

(72) Inventors: Masahiro Saeki, Minamitsuru-gun (JP); Shinichi Kuwahata, Minamitsuru-gun (JP); Asunaro Maeda, Minamitsuru-gun (JP)

(73) Assignee: FANUC CORPORATION, Minamitsuru-gun (JP)

( * ) Notice: Subject to any disclaimer, the term of this patent is extended or adjusted under 35 U.S.C. 154(b) by 377 days.

(21) Appl. No.: 18/283,635

(22) PCT Filed: Mar. 11, 2022

(86) PCT No.: PCT/JP2022/010778
§ 371 (c)(1),
(2) Date: Sep. 22, 2023

(87) PCT Pub. No.: WO2022/202391
PCT Pub. Date: Sep. 29, 2022

(65) Prior Publication Data

US 2024/0168449 A1 May 23, 2024

(30) Foreign Application Priority Data

Mar. 24, 2021 (JP) ................................ 2021-050056

(51) Int. Cl.
*G05B 19/05* (2006.01)

(52) U.S. Cl.
CPC ......... *G05B 19/054* (2013.01); *G05B 19/052* (2013.01)

(58) Field of Classification Search
CPC ................ G05B 19/054; G05B 19/052; G05B 2219/2231; G06F 13/4247; H04L 12/12
See application file for complete search history.

(56) References Cited

U.S. PATENT DOCUMENTS 6,671,705 B1 * 12/2003 Duprey ............... G06F 11/2074
11,847,338 B2 * 12/2023 Golov ..................... G06F 3/064
2007/0016308 A1 * 1/2007 Kusumi ............ G05B 19/0421 700/20

(Continued)

FOREIGN PATENT DOCUMENTS

CN 102314161 A 1/2012
CN 107818066 A 3/2018

(Continued)

OTHER PUBLICATIONS

International Search Report of PCT/JP2022/010778 dated May 17, 2022 [PCT/ISA/210].

(Continued)

*Primary Examiner* — Farley Abad
(74) *Attorney, Agent, or Firm* — Sughrue Mion, PLLC

(57) ABSTRACT

An I/O unit comprises: a plurality of first-stage-side terminals for connecting to a master unit or another I/O unit; a plurality of second-stage-side terminals that are provided in order to connect to the other I/O unit, and are connected to mutually distinct first-stage-side terminals; and a slave process circuit that performs signal processing and is connected to one of the plurality of first-stage-side terminals and to the second-stage-side terminal connected to that first-stage-side terminal.

8 Claims, 6 Drawing Sheets

(56) References Cited

U.S. PATENT DOCUMENTS

| | | | | |
|---|---|---|---|---|
| 2009/0083464 | A1* | 3/2009 | Beckhoff | H04L 12/423 710/110 |
| 2013/0159593 | A1* | 6/2013 | Yeung | G06F 13/4022 710/316 |
| 2013/0297829 | A1 | 11/2013 | Berenbaum et al. | |
| 2016/0342373 | A1 | 11/2016 | Huang et al. | |
| 2019/0243793 | A1 | 8/2019 | Karb et al. | |
| 2020/0333758 | A1 | 10/2020 | Kretschmann | |
| 2020/0401547 | A1* | 12/2020 | Kawabe | G06F 1/3268 |

FOREIGN PATENT DOCUMENTS

| | | | |
|---|---|---|---|
| JP | 9-244772 | A | 9/1997 |
| JP | 09-247766 | A | 9/1997 |
| JP | 2002-091519 | A | 3/2002 |
| JP | 2011-130307 | A | 6/2011 |
| JP | 2016-110460 | A | 6/2016 |
| JP | 2018-157456 | A | 10/2018 |
| JP | 2019-114085 | A | 7/2019 |
| JP | 2021-002172 | A | 1/2021 |
| TW | 201642141 | A | 12/2016 |

OTHER PUBLICATIONS

Extended European Search Report dated Feb. 10, 2025 in Application No. 22775183.1.

* cited by examiner 100
102
La
La
106a (106)
106b (106)
16
16
Lb1
Lb2
108a (108)
108b (108)
26
28
104a (104)
104b (104)

10
102
La
20a (20)
18
16a (16)
12
22a (22)
30a (30)
Lb1
Lb2
16b (16)
20b (20)
22b (22)
24
14A (14)
32a (32)
34
26a (26)
30b (30)
36
32b (32)
28
104
38
14B (14)
26b (26)

14' (14)
32a (32)
32b (32)
30a (30)
30b (30)
26
40

10' (10)
20a (20)
20b (20)
16
22
1
2
3
4
14" (14)
26
30
32
40' (40)

I/O UNIT AND COMMUNICATION SYSTEM

CROSS REFERENCE TO RELATED APPLICATIONS

This application is a National Stage of International Application No. PCT/JP2022/010778 filed on Mar. 11, 2022, claiming priority based on Japanese Patent Application No. 2021-050056 filed on Mar. 24, 2021, which are incorporated by reference herein.

TECHNICAL FIELD

The present invention relates to an I/O unit that connects a master unit and a device and transmits a signal between the master unit and the device, and also relates to a communication system including a plurality of the I/O units.

BACKGROUND ART

JP 2016-110460 A discloses a programmable logic controller system. The programmable logic controller system includes a base unit (master) and a plurality of expansion units (slaves). The base unit and the plurality of expansion units are daisy-chain connected together, with the master unit being at the head. Each of the plurality of expansion units is, for example, an I/O unit. The base unit transmits and receives signals to and from a controlled device via the plurality of expansion units. The controlled device is, for example, a sensor or an actuator.

SUMMARY OF THE INVENTION

The master unit and the plurality of I/O units are arranged along a predetermined installation direction with the master unit at the head. The terminal of the master unit and the terminal of the I/O unit next to each other are connected to each other. The terminals of the adjacent I/O units are connected to each other. With this configuration, the master unit and the plurality of I/O units are communicably connected to each other without separately requiring a cable or the like. Hereinafter, a group including a master unit and a plurality of I/O units which are communicably connected to each other is also referred to as a "station". The station is configured without cables as described above. Therefore, a state of wiring around the station is unlikely to be complicated. Further, erroneous connection of the cable does not occur.

The master unit includes a predetermined processing circuit (master processing circuit). The master processing circuit is a circuit that performs signal processing in communication with the I/O unit. However, the number of I/O units connectable to the master processing circuit is limited based on the design.

Therefore, when the number of I/O units that the operator desires to use exceeds the limit on the number of I/O units connectable to the master processing circuit, the operator has to separately install another station.

The present invention has the object of solving the aforementioned problems.

According to a first aspect of the present invention, there is provided an I/O unit that connects a master unit and a device and transmits a signal between the master unit and the device, the I/O unit including: a plurality of preceding-stage terminals configured to be connected to the master unit provided in a preceding stage of the I/O unit or to another I/O unit provided in the preceding stage; a plurality of subsequent-stage terminals configured to be connected to another I/O unit provided in a subsequent stage of the I/O unit, the subsequent-stage terminals being connected respectively to the different preceding-stage terminals; and a slave processing circuit connected to one preceding-stage terminal among the plurality of preceding-stage terminals and to a subsequent-stage terminal among the subsequent-stage terminals that is connected to the one preceding-stage terminal, the slave processing circuit being configured to perform signal processing.

According to a second aspect of the present invention, there is provided a communication system including a master unit and a plurality of I/O units connected to the master unit and configured to transmit a signal between the master unit and a device, wherein the master unit includes: a plurality of master processing circuits configured to perform signal processing; and a plurality of branch-line terminals connected respectively to the different master processing circuits, wherein each of the plurality of I/O units includes: a plurality of preceding-stage terminals configured to be connected to the master unit provided in a preceding stage of the I/O unit or to another I/O unit provided in the preceding stage; a plurality of subsequent-stage terminals configured to be connected to another I/O unit provided in a subsequent stage of the I/O unit, the subsequent-stage terminals being connected respectively to the different preceding-stage terminals; and a slave processing circuit connected to one preceding-stage terminal among the plurality of preceding-stage terminals and to a subsequent-stage terminal among the subsequent-stage terminals that is connected to the one preceding-stage terminal, the slave processing circuit being configured to perform signal processing, and wherein the plurality of I/O units include: a plurality of first I/O units the slave processing circuits of which are connected to a first master processing circuit of the master processing circuits; and a plurality of second I/O units the slave processing circuits of which are connected to a second master processing circuit of the master processing circuits that is different from the first master processing circuit.

According to aspects of the present invention, it is possible to provide an I/O unit that can be easily added in a station, and a communication system including a plurality of the I/O units.

DETAILED DESCRIPTION OF THE INVENTION

A preferred embodiment of an I/O unit (input/output unit) and a communication system according to the present invention will be described in detail below with reference to the accompanying drawings.

EMBODIMENTS

Figure 1:
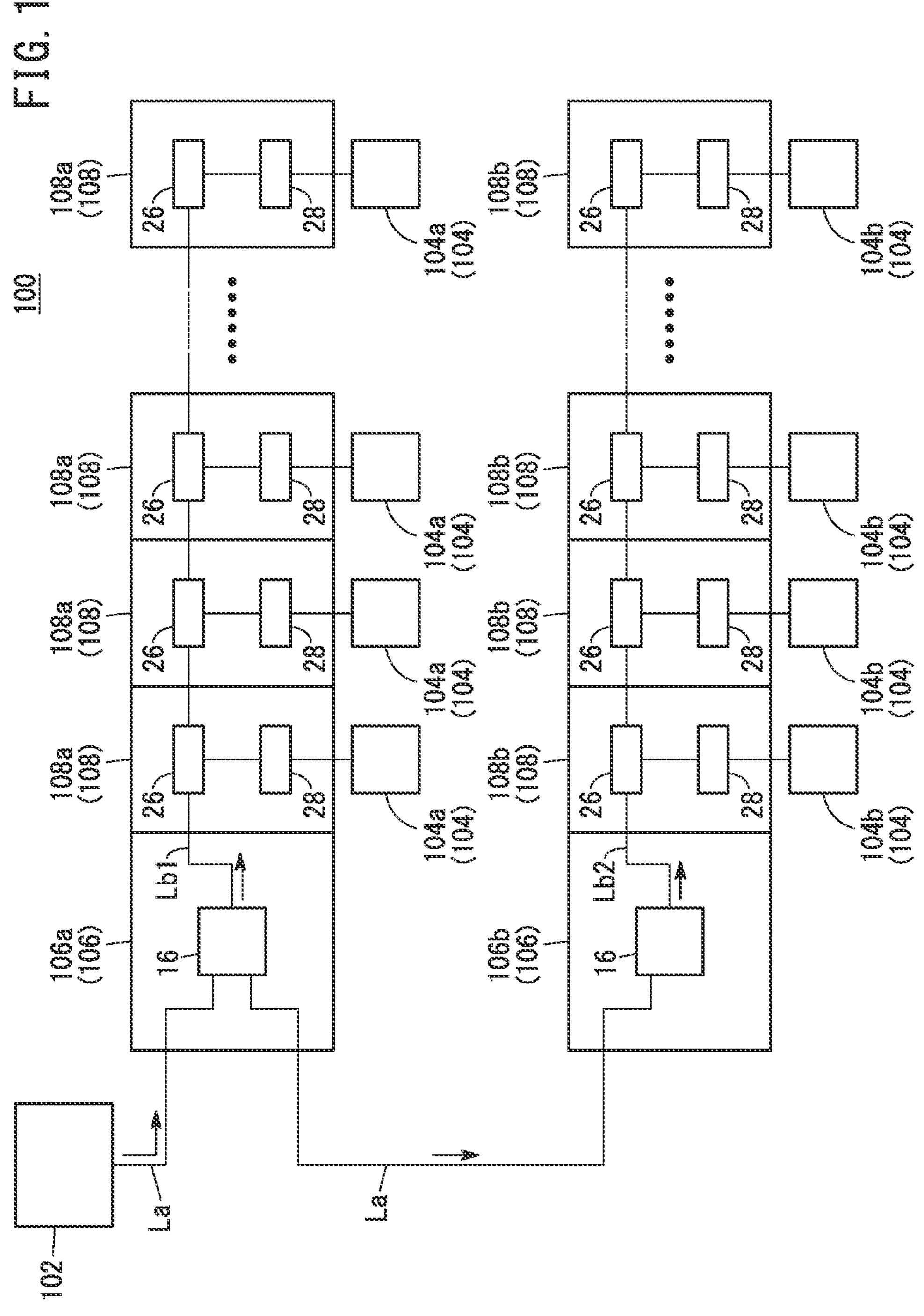
FIG. 1 is a diagram illustrating a communication system according to a reference example of the present invention.

FIG. 1 is a diagram illustrating a communication system 100 according to a reference example of the present invention.

The communication system 100 is a system that transmits signals between a control device 102 and a device 104. The device 104 is provided in a mechanical apparatus. The mechanical apparatus is, for example, a machine tool or a robot. The device 104 includes an output device 104*a* and an input device 104*b*. The output device 104*a* is, for example, an actuator such as a switch. When driving the output device 104*a*, the control device 102 sends a control signal to the output device 104*a* via the communication system 100. The input device 104*b* is, for example, a sensor that detects pressure, voltage, current, or the like. The control device 102 acquires a detection signal from the input device 104*b*, via the communication system 100.

The communication system 100 includes a plurality of communication coupler units 106 (106*a*, 106*b*) and a plurality of I/O units 108. The I/O units 108 include a plurality of I/O units 108*a* and a plurality of I/O units 108*b*.

The control device 102, the communication coupler unit 106*a*, and the communication coupler unit 106*b* are sequentially connected in this order. As a result, a communication path (main line La) that passes through the control device 102, the communication coupler unit 106*a*, and the communication coupler unit 106*b* in this order is formed. The control device 102 and the communication coupler unit 106*a* are connected using a cable. Further, the communication coupler unit 106*a* and the communication coupler unit 106*b* are connected using another cable. The cables are prepared by the operator.

The plurality of I/O units 108*a* are sequentially connected in the subsequent stage of the communication coupler unit 106*a*. Thus, the communication coupler unit 106*a* and the plurality of I/O units 108*a* constitute one station. In addition, a communication path (branch line Lb1) that sequentially passes through the communication coupler unit 106*a* and the plurality of I/O units 108*a* is configured.

The plurality of I/O units 108*b* are sequentially connected in the subsequent stage of the communication coupler unit 106*b*. Thus, the communication coupler unit 106*b* and the plurality of I/O units 108*b* constitute one station. In addition, a communication path (branch line Lb2) that sequentially passes through the communication coupler unit 106*b* and the plurality of I/O units 108*b* is configured.

The plurality of I/O units 108 are connected to the plurality of devices 104. The plurality of I/O units 108 in FIG. 1 are connected respectively to the different devices 104. However, a plurality of devices 104 may be connected to one I/O unit 108.

Each of the communication coupler unit 106*a* and the communication coupler unit 106*b* includes a master processing circuit 16. Each of the I/O units 108*a* and 108*b* includes a slave processing circuit 26 and an interface 28. The slave processing circuit 26 is a circuit that inputs and outputs signals to and from the master processing circuit 16. Each of the master processing circuit 16 and the slave processing circuit 26 includes, for example, a central processing unit (CPU). However, each of the master processing circuit 16 and the slave processing circuit 26 may include, for example, an application specific integrated circuit (ASIC), a programmable logic device (PLD), a field programmable logic gate array (FPGA), or the like. The interface 28 is hardware (a circuit or an electronic component group) that transmits signals between the slave processing circuit 26 and the device 104. The interface 28 connects the slave processing circuit 26 and the device 104, and the slave processing circuit 26 performs input and output of signals with respect to the device 104. The specific configuration of the interface 28 varies depending on the type of the device 104.

The master processing circuit 16 of the communication coupler unit 106*a* and the master processing circuit 16 of the communication coupler unit 106*b* are daisy-chain connected by the main line La with the control device 102 being at the head. The slave processing circuits 26 of the plurality of I/O units 108*a* are daisy-chain connected by the branch line Lb1 with the master processing circuit 16 of the communication coupler unit 106*a* being at the head. Further, the slave processing circuits 26 of the plurality of I/O units 108*b* are daisy-chain connected by the branch line Lb2 with the master processing circuit 16 of the communication coupler unit 106*b* being at the head.

When the control device 102 transmits a control signal to the device 104, the control device 102 outputs the control signal to the communication coupler unit 106*a* connected to the first stage (first) of the control device 102 itself. The control signal includes address information etc. of the I/O unit 108 to which the device 104 as a transmission target is connected. The master processing circuit 16 of the communication coupler unit 106*a* determines whether the address information included in the control signal indicates any one of the plurality of I/O units 108*a*. When the address information does not indicate any one of the plurality of I/O units 108*a*, the master processing circuit 16 of the communication coupler unit 106*a* outputs the control signal to the master processing circuit 16 of the communication coupler unit 106*b*. When the address information indicates any one of the plurality of I/O units 108*a*, the master processing circuit 16 of the communication coupler unit 106*a* outputs the control signal to the I/O unit 108*a* provided in the subsequent stage of the communication coupler unit 106*a* itself. The slave processing circuit 26 of the I/O unit 108*a* that has received the control signal from the preceding stage determines whether or not the address information included in the received control signal indicates the I/O unit 108*a* itself. When the address information indicates the I/O unit 108*a* itself, the slave processing circuit 26 of the I/O unit 108*a* outputs the control signal to the device 104 connected to the I/O unit 108*a* itself. Thus, the device 104 is caused to operate. On the other hand, when the address information included in the input control signal does not indicate the I/O unit 108*a* itself, the I/O unit 108*a* outputs the control signal to another I/O unit 108*a* provided in the subsequent stage of the I/O unit 108*a* itself. When the address information included in the control signal indicates the I/O unit 108 itself, the I/O unit 108 may output the control signal to another I/O unit 108 provided in the subsequent stage. In addition, when the address information included in the control signal indicates the I/O unit 108 connected to the communication coupler unit 106 itself, the communication coupler unit 106 may output the control signal to the next communication coupler unit 106 provided in the subsequent stage.

There is a case where the device 104 may output a signal to the control device 102. In this case, the signal of the device 104 is input to the slave processing circuit 26 of the I/O unit 108 to which the device 104 is connected. The slave processing circuit 26 transmits a signal input from the device 104 connected to the slave processing circuit 26 itself, to the control device 102. In this case, the slave processing circuit 26 outputs the signal to the I/O unit 108 or the communication coupler unit 106 connected to the preceding stage of the slave processing circuit 26 itself. Here, the slave processing circuit 26 adds the content output by the device 104 and the address information of the I/O unit 108 that has output the signal, to the output signal. The input and output of signals between the communication coupler unit 106 and the I/O unit 108 is a well-known technique and thus further description thereof is omitted.

Incidentally, in the reference example, as described above, the station with the communication coupler unit 106*a* at the head and the station with the communication coupler unit 106*b* at the head are configured.

As described above, a limit is set on the number of I/O units (slave processing circuits 26) 108 that can be connected, as slaves, to the master processing circuit 16. Therefore, when the number of the I/O units 108 exceeds the limit, the operator is forced to install a plurality of stations and connect the stations using cables separately prepared.

However, it is preferable for the operator that all of the communication coupler units 106 and the necessary I/O units 108 be installed together as much as possible.

In light of the above, embodiments of the present invention will be described below. Components similar to the components described in the reference example are denoted by the same reference numerals, description thereof is omitted, and portions different from the reference example will be mainly described.

Figure 2:
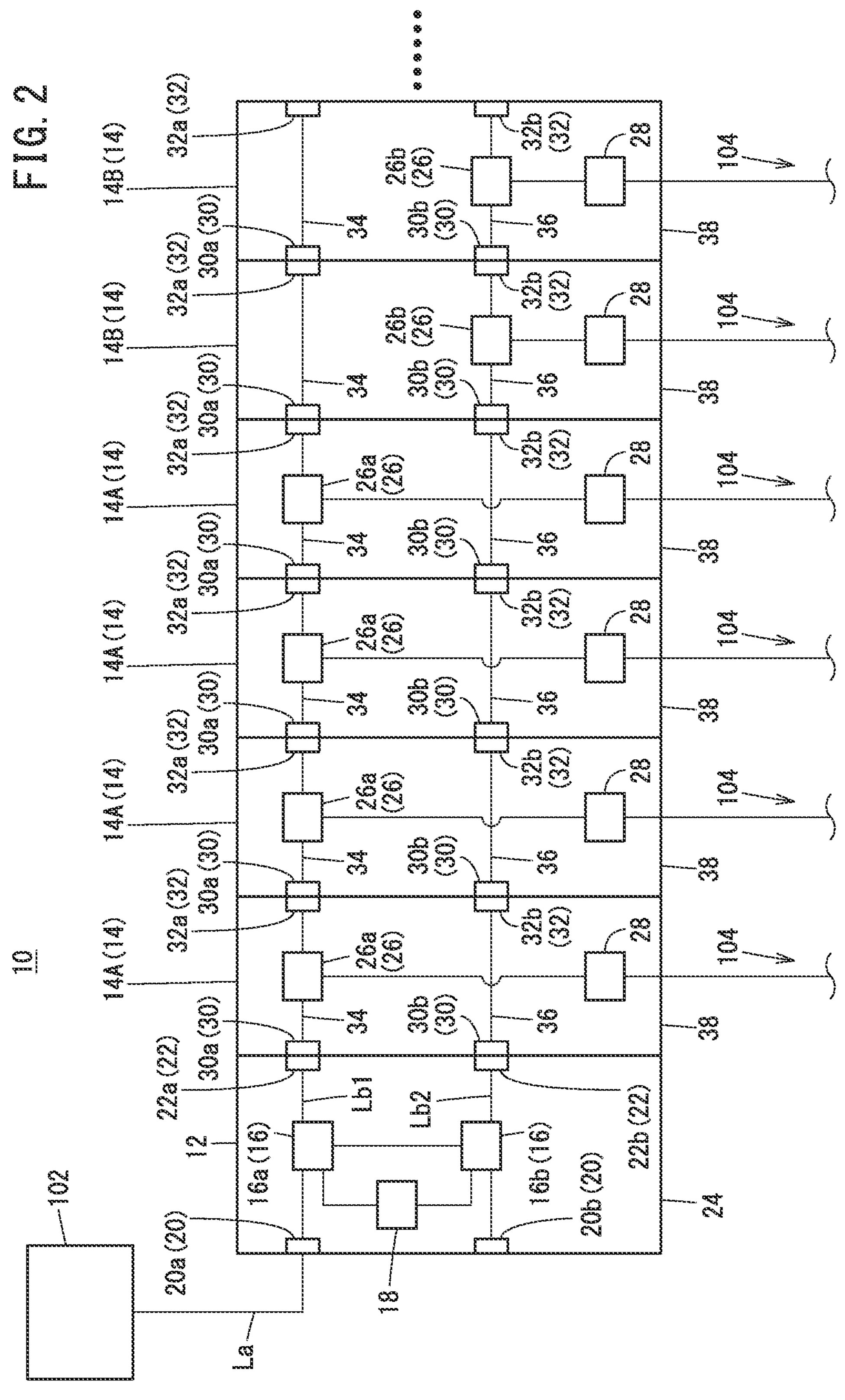
FIG. 2 is a diagram showing a communication system according to an embodiment of the present invention.

FIG. 2 is a diagram illustrating a communication system 10 according to an embodiment of the present invention. The communication system 10 includes a communication coupler unit 12 and a plurality of I/O units 14. The plurality of I/O units 14 are sequentially connected to the subsequent stage of the communication coupler unit 12.

The communication coupler unit 12 includes a plurality of master processing circuits 16, a power supply 18, two connectors 20 (20*a* and 20*b*), a plurality of branch-line terminals 22, and a housing 24. The plurality of master processing circuits 16, the power supply 18, the two connectors 20 (20*a*, 20*b*), and the plurality of branch-line terminals 22 are housed in the housing 24.

The communication coupler unit 12 includes two master processing circuits 16 (16*a*, 16*b*). However, the communication coupler unit 12 may include three or more master processing circuits 16. In the following description, one master processing circuit 16*a* of the two master processing circuits 16 included in one communication coupler unit 12 is also referred to as a first master processing circuit 16*a*. On the other hand, the other master processing circuit 16*b* is also referred to as a second master processing circuit 16*b* in the following description.

The power supply 18 supplies electric power to the two master processing circuits 16. The power supply 18 may also provide electric power to at least one of the slave processing circuit 26 or the interface 28 of the I/O unit 14.

The connector 20*a* is a connector for connection to a device provided in the preceding stage of the communication coupler unit 12 with respect to the main line La. The device provided in the preceding stage of the communication coupler unit 12 with respect to the main line La is, for example, the control device 102 (see FIG. 2). The connection between the connector 20*a* and the control device 102 is made by a cable as before. However, the connector 20*a* may be connected to another communication coupler unit 12 provided in the preceding stage of the communication coupler unit 12 or to the communication coupler unit 106, in the main line La. The connector 20*b* is a connector for connection to another communication coupler unit 12 provided in the subsequent stage of the communication coupler unit 12 or to the communication coupler unit 106, with respect to the main line La. However, the connector 20*b* is in an open state in the example of FIG. 2. If another communication coupler unit 12 is provided in the subsequent stage of the communication coupler unit 12 with respect to the main line La, the connector 20*b* of the communication coupler unit 12 and the connector 20*a* of the other communication coupler unit 12 are connected by a cable.

The connector 20*a* is connected to the master processing circuit 16*a*. The master processing circuit 16*a* is connected to the master processing circuit 16*b*. Therefore, the control device 102, the master processing circuit 16*a* and the master processing circuit 16*b* are daisy-chain connected to each other on the main line La.

Each of the plurality of branch-line terminals 22 is a terminal for connection to the I/O unit 14 provided in the subsequent stage of the communication coupler unit 12. The number of branch-line terminals 22 provided in the communication coupler unit 12 is the same as the number of master processing circuits 16 provided in the communication coupler unit 12. That is, the communication coupler unit 12 includes two branch-line terminals 22. One branch-line terminal 22 of the two branch-line terminals 22 is also referred to as a branch-line terminal 22*a* in the following description. On the other hand, the other branch-line terminal 22 is also referred to as a branch-line terminal 22*b*.

The branch-line terminal 22*a* is connected to the master processing circuit 16*a*. The branch-line terminal 22*b* is connected to the master processing circuit 16*b*. That is, the plurality of branch-line terminals 22 are connected respectively to the different master processing circuits 16.

Each of the plurality of I/O units 14 includes a slave processing circuit 26, an interface 28, a plurality of preceding-stage terminals 30, a plurality of subsequent-stage terminals 32, and a housing 38. The slave processing circuit 26, the interface 28, the plurality of preceding-stage terminals 30, and the plurality of subsequent-stage terminals 32 are accommodated in the housing 38.

Each of the plurality of preceding-stage terminals 30 is a terminal for connection to the communication coupler unit 12 provided in the preceding stage or another I/O unit 14 provided in the preceding stage. The number of the preceding-stage terminals 30 is the same as the number of the branch-line terminals 22 provided in the communication coupler unit 12. That is, the I/O unit 14 includes two preceding-stage terminals 30. One preceding-stage terminal 30 of the two preceding-stage terminals 30 is also referred to as a preceding-stage terminal 30*a* in the following description. On the other hand, the other preceding-stage terminal 30 is also referred to as a preceding-stage terminal 30*b*.

Each of the plurality of subsequent-stage terminals 32 is a terminal for connection to another I/O unit 14 provided in the subsequent stage. The number of the subsequent-stage terminals 32 is the same as the number of the preceding-stage terminals 30 provided in the I/O unit 14. That is, the I/O unit 14 includes two subsequent-stage terminals 32. One subsequent-stage terminal 32 of the two subsequent-stage terminals 32 is also referred to as a subsequent-stage terminal 32*a* in the following description. On the other hand, the other subsequent-stage terminal 32 is also referred to as a subsequent-stage terminal 32*b* in the following description.

The preceding-stage terminal 30*a* is connected to the subsequent-stage terminal 32*a* through a first signal line 34. In addition, the preceding-stage terminal 30*b* is connected to the subsequent-stage terminal 32*b* through a second signal line 36. That is, in the single I/O unit 14, the plurality of preceding-stage terminals 30 are connected respectively to the different subsequent-stage terminals 32.

When the communication coupler unit 12 is installed at the preceding stage of the I/O unit 14, the preceding-stage terminal 30*a* is connected to the branch-line terminal 22*a* of the communication coupler unit 12. The preceding-stage terminal 30*b* is connected to the branch-line terminal 22*b* of the communication coupler unit 12. Alternatively, when another I/O unit 14 is installed at the preceding stage of the I/O unit 14, the preceding-stage terminal 30*a* of the I/O unit 14 is connected to the subsequent-stage terminal 32*a* of the other I/O unit 14. The preceding-stage terminal 30*b* of the I/O unit 14 is connected to the subsequent-stage terminal 32*b* of the other I/O unit 14.

The slave processing circuit 26 of each of the plurality of I/O units 14 is connected to one of the plurality of preceding-stage terminals 30 and to the subsequent-stage terminal 32 that is connected to the one preceding-stage terminal 30. For example, the slave processing circuit 26 is connected to the preceding-stage terminal 30*a* and the subsequent-stage terminal 32*a*. However, the slave processing circuit 26 may be connected to the preceding-stage terminal 30*b* and the subsequent-stage terminal 32*b*.

The I/O units 14 are classified into first I/O units 14A and second I/O units 14B. The first I/O units 14A are I/O units 14 whose slave processing circuits 26 are provided on the first signal line 34. The second I/O units 14B are I/O units 14 whose slave processing circuits 26 are provided on the second signal line 36. The slave processing circuits 26 (26*a*) of the first I/O units 14A are connected to the master processing circuit 16*a* in the branch line Lb1. On the other hand, the slave processing circuits 26 (26*b*) of the second I/O units 14B are connected to the master processing circuit 16*b* in the branch line Lb2.

A signal input to and output from the preceding-stage terminal 30*b* and the subsequent-stage terminal 32*b* of each of the first I/O units 14A passes past the first I/O unit 14A through the second signal line 36 as it is. On the other hand, a signal input to and output from the preceding-stage terminal 30*a* and the subsequent-stage terminal 32*a* of each of the second I/O units 14B passes past the second I/O unit 14B through the first signal line 34 as it is.

According to the present embodiment, each of the first I/O units 14A operates as a slave of the master processing circuit 16*a*. Further, each of the second I/O units 14B operates as a slave of the master processing circuit 16*b*. Moreover, the first I/O units 14A and the second I/O units 14B are installed together in a single line within one station. When the required number of I/O units 14 exceeds the limit on the number of master processing circuits 16*a*, the operator can set the excess I/O units as slaves of the master processing circuit 16*b*.

As described above, according to the present embodiment, the I/O unit 14 that can be easily added in the station and the communication system 10 including a plurality of the I/O units 14 are provided.

In the example of FIG. 2, the plurality of first I/O units 14A are provided on the preceding stage side of the plurality of second I/O units 14B. The communication system 10 is not limited to this. For example, the plurality of second I/O units 14B may be arranged on the preceding stage side of the plurality of first I/O units 14A. Further, the plurality of first I/O units 14A and the plurality of second I/O units 14B may be arranged in a mixed manner.

Modifications

The embodiment has been described above as an example of the present invention. It is noted that various modifications or improvements are capable of being added to the above-described embodiment. Further, it is clear from the scope of the claims that other modes to which such modifications or improvements have been added can be included within the technical scope of the present invention.

Hereinafter, exemplary modifications according to the embodiment will be described. However, explanations that overlap with those of the embodiment will be omitted insofar as possible in the following description. Components that have already been described in the above embodiment are denoted by the same reference numerals as in the above embodiment unless otherwise indicated.

Modification 1

Figures 3A, 3B, 3C:
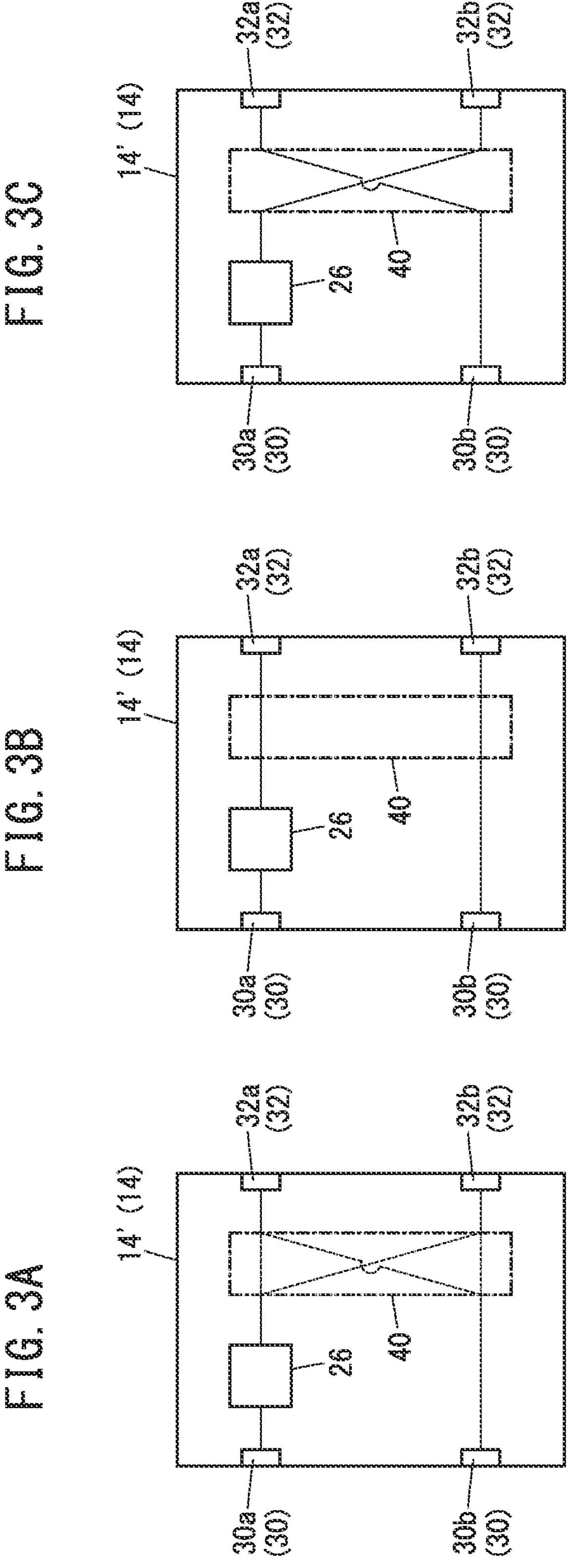
FIG. 3A is a diagram illustrating an I/O unit according to a first modification.
FIG. 3B is a diagram illustrating the I/O unit when a first connection relationship is selected.
FIG. 3C is a diagram showing the I/O unit when a second connection relationship is selected.

FIG. 3A illustrates an I/O unit 14' (14) according to a first modification.

In addition to the components of the I/O unit 14 (see also FIG. 2), the I/O unit 14' further includes a selection circuit 40. The selection circuit 40 is a circuit that selects one from combinations of the plurality of preceding-stage terminals 30 and the plurality of subsequent-stage terminals 32 that are connected to each other. The I/O unit 14' includes two preceding-stage terminals 30 and two subsequent-stage terminals 32. In this case, the selection circuit 40 selects one from the connection relationships between the two preceding-stage terminals 30 and the two subsequent-stage terminals 32, more specifically, selecting between a first connection relationship and a second connection relationship as described below.

FIG. 3B illustrates the I/O unit 14' when the first connection relationship is selected.

For example, as shown in FIG. 3B, when selecting the first connection relationship, the selection circuit 40 connects the preceding-stage terminal 30*a* to the subsequent-stage terminal 32*a* and connects the preceding-stage terminal 30*b* to the subsequent-stage terminal 32*b*.

FIG. 3C shows the I/O unit 14' when the second connection relationship is selected.

In addition, for example, as illustrated in FIG. 3C, when selecting the second connection relationship, the selection circuit 40 connects the preceding-stage terminal 30*a* to the subsequent-stage terminal 32*b* and connects the preceding-stage terminal 30*b* to the subsequent-stage terminal 32*a*.

The selection circuit 40 is appropriately configured by using a conductor and a switch such as a mechanical switch, an electrical switch, a semiconductor switch, or the like. The selection circuit 40 may be configured as a part of another circuit. For example, the selection circuit 40 may be configured as a part of an ASIC.

According to the present modification, the connection relationship between the two preceding-stage terminals 30 and the two subsequent-stage terminals 32 in the I/O unit 14' can be easily changed by the selection circuit 40. Further, the difference between the first I/O unit 14A and the second I/O unit 14B is handled in the selection circuit 40. That is, the configuration of the first I/O unit 14A and the configuration of the second I/O unit 14B are unified. The selection of the connection relationship need not be possible at all times, and may be possible only during assembly of the I/O unit 14, for example.

In the illustration of FIGS. 3A to 3C, the selection circuit 40 is provided so as to be interposed between the slave processing circuit 26 and one of the two subsequent-stage terminals 32. In this case, the selection circuit 40 changes the master processing circuit 16 that is to be a connection destination for the slave processing circuit 26 of another I/O unit 14 provided in the subsequent stage of the I/O unit 14.

Figure 4:
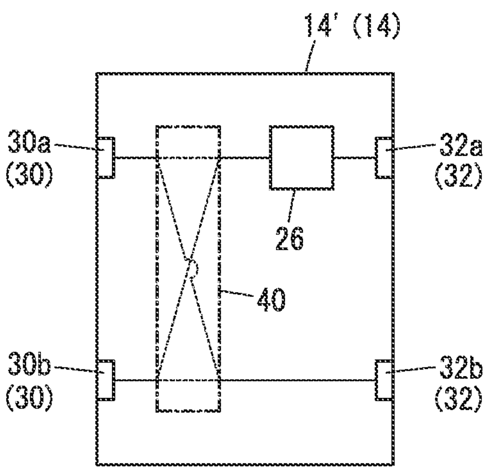
FIG. 4 is a diagram illustrating an I/O unit in which the arrangement of a selection circuit is changed.

FIG. 4 is a diagram showing an I/O unit 14' in which the arrangement of the selection circuit 40 is changed.

As shown in FIG. 4, the selection circuit 40 may be provided so as to be interposed between the slave processing circuit 26 and one of the two preceding-stage terminals 30. In this case, the selection circuit 40 changes the master processing circuit 16 that is to be a connection destination for the slave processing circuit 26 of the I/O unit 14 to which the selection circuit 40 itself belongs.

As described above, the effect of the selection circuit 40 differs depending on whether the selection circuit 40 is provided on the subsequent-stage terminal 32 side or on the preceding-stage terminal 30 side of the slave processing circuit 26. In view of this, the I/O unit 14' may include the selection circuit 40 provided on the subsequent-stage terminal 32 side of the slave processing circuit 26 and another selection circuit 40 provided on the preceding-stage terminal 30 side of the slave processing circuit 26.

Modification 2

Figure 5:
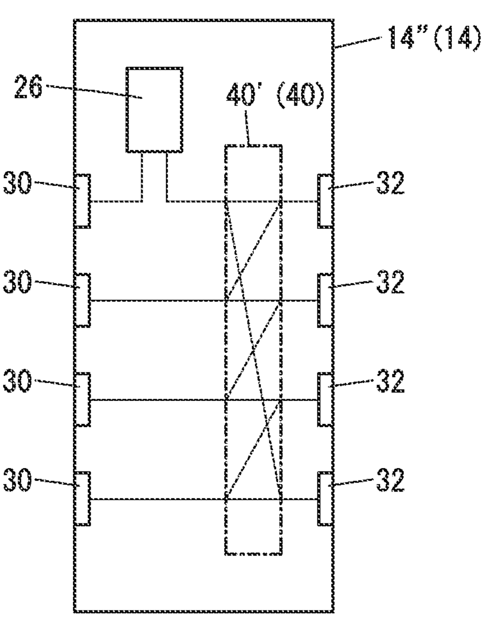
FIG. 5 is a diagram illustrating an I/O unit according to a second modification.

FIG. 5 is a diagram illustrating an I/O unit 14" (14) according to a second modification.

The I/O unit 14" includes four preceding-stage terminals 30, four subsequent-stage terminals 32, and a selection circuit 40'.

Similarly to the first modification, the selection circuit 40' appropriately includes various switches and the like. The selection circuit 40' selects one from combinations of the plurality of preceding-stage terminals 30 and the plurality of subsequent-stage terminals 32 which are connected to each other, more specifically selects between a first connection relationship (in indicated by the solid line in FIG. 5) and a second connection relationship (indicated by the broken line in FIG. 5). The first connection relationship is a connection relationship in which each of the plurality of preceding-stage terminals 30 is connected to one of the two subsequent-stage terminals 32 predetermined for the preceding-stage terminal itself. The second connection relationship is a connection relationship in which each of the plurality of preceding-stage terminals 30 is connected to the other of the two subsequent-stage terminals 32 predetermined for the preceding-stage terminal itself. In both cases of the first connection relationship and the second connection relationship, the plurality of preceding-stage terminals 30 are connected respectively to the different subsequent-stage terminals 32.

The selection circuit 40' may be provided on the subsequent-stage terminal 32 side of the slave processing circuit 26 in the I/O unit 14". In this case, the selection circuit 40' changes the master processing circuit 16 that is to be a connection destination for the slave processing circuit 26 of another I/O unit 14 provided in the subsequent stage of the I/O unit 14". In addition, the selection circuit 40' may be provided on the preceding-stage terminal 30 side of the slave processing circuit 26 in the I/O unit 14". In this case, the selection circuit 40' changes the master processing circuit 16 that is to be a connection destination for the slave processing circuit 26 of the I/O unit 14" to which the selection circuit 40' itself belongs.

Figure 6:
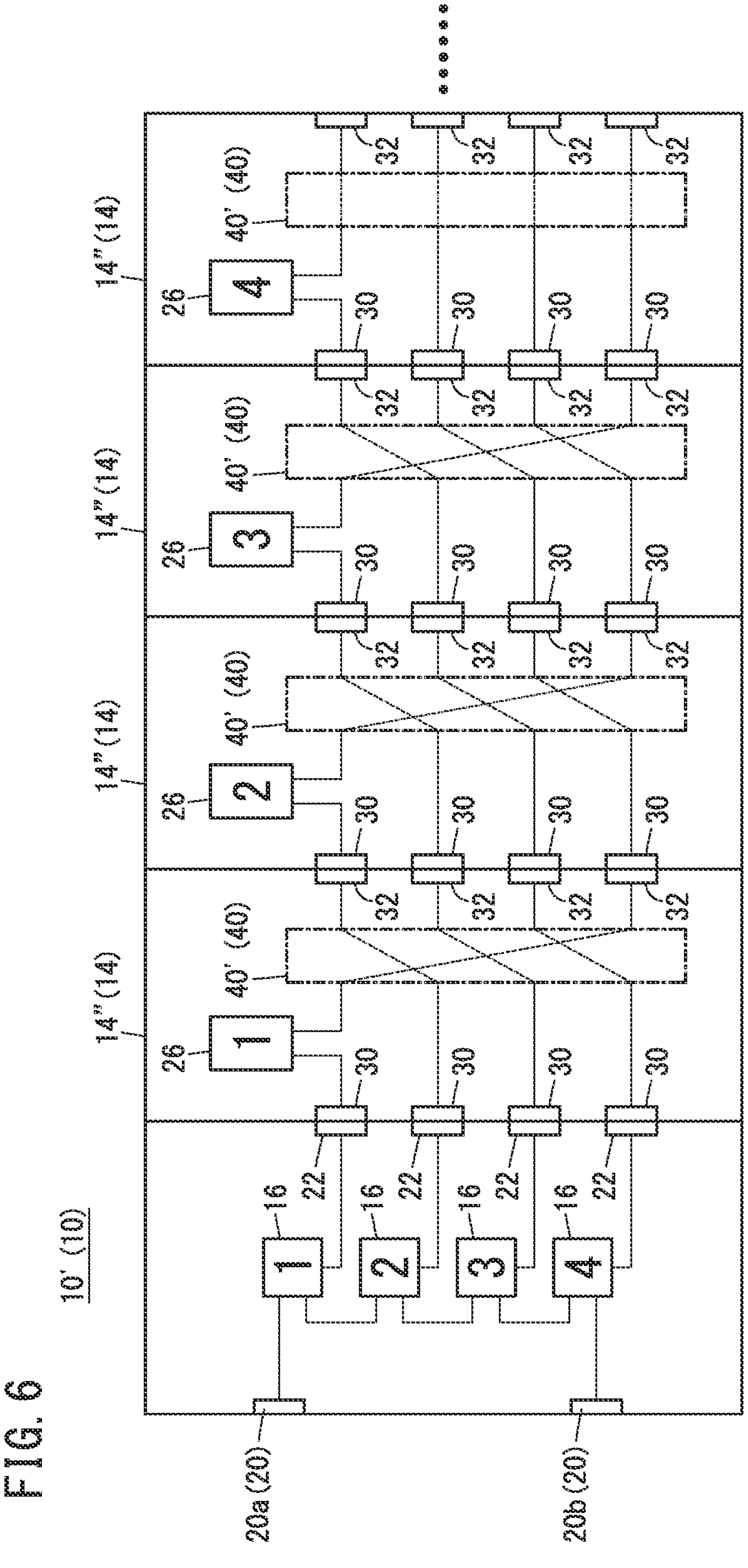
FIG. 6 is a diagram illustrating a communication system including the I/O unit according to the second modification.

FIG. 6 is a diagram illustrating a communication system 10' including an I/O unit 14" according to a second modification. In FIG. 6, number symbols 1 to 4 respectively attached to the four master processing circuits 16 and number symbols 1 to 4 respectively attached to the four slave processing circuits 26 indicate correspondence relationships between the master processing circuits 16 and the slave processing circuits 26 connected to the respective master processing circuits 16.

According to this modification, as shown in FIG. 6, the entire configurations of the I/O units 14" are standardized. Further, by changing (selecting) only the selection circuit 40', it is possible to connect a plurality of the slave processing circuits 26 respectively to the different master processing circuits 16.

Modification 3

When the communication coupler unit 12 includes two or more master processing circuits 16, one of the two master processing circuits 16 may be a redundant circuit of the other master processing circuit 16. This improves the safety and reliability of the communication system 10.

Inventions that can be Obtained from the Embodiment

The inventions that can be grasped from the above-described embodiment and the modifications thereof will be described below.

<First Invention>

A first invention is characterized by the I/O unit (14) that connects the master unit (12) and the device (104) and transmits a signal between the master unit and the device, the I/O unit (14) including: the plurality of preceding-stage terminals (30) configured to be connected to the master unit provided in the preceding stage of the I/O unit or to another I/O unit provided in the preceding stage; the plurality of subsequent-stage terminals (32) configured to be connected to another I/O unit provided in the subsequent stage of the I/O unit, the subsequent-stage terminals being connected respectively to the different preceding-stage terminals; and the slave processing circuit (26) connected to one preceding-stage terminal among the plurality of preceding-stage terminals and to the subsequent-stage terminal among the subsequent-stage terminals that is connected to the one preceding-stage terminal, the slave processing circuit being configured to perform signal processing.

This provides an I/O unit that can be easily added within a station.

The first invention may further include the selection circuit (40) configured to select a combination of the plurality of preceding-stage terminals and the plurality of subsequent-stage terminals which are connected to each other. With this configuration, it is possible to change the combination of the plurality of preceding-stage terminals and the plurality of subsequent-stage terminals by changing only the selection circuit while keeping the overall configuration of the I/O unit unchanged.

The master unit may include a plurality of the master processing circuits (16), and the plurality of preceding-stage terminals may be connected respectively to the different master processing circuits. Accordingly, signals are input to the I/O unit from the plurality of master processing circuits. A signal of one master processing circuit among the plurality of master processing circuits is processed by the slave processing circuit, and a signal of the other master processing circuit passes past the I/O unit as it is and goes toward the subsequent stage.

The preceding-stage terminal and the subsequent-stage terminal connected to the slave processing circuit may be connected to each other via the slave processing circuit. Thus, the plurality of slave processing circuits are daisy-chain connected together by sequentially connecting the plurality of I/O units.

The first invention may further include the interface (28) configured to connect the slave processing circuit and the device and allow the slave processing circuit to perform input and output of a signal with respect to the device.

<Second Invention>

A second aspect of the present invention is characterized by the communication system (10) including the master unit (12) and the plurality of I/O units (14) connected to the master unit and configured to transmit a signal between the master unit and the device (104), wherein the master unit includes: the plurality of master processing circuits (16) configured to perform signal processing; and the plurality of branch-line terminals (22) connected respectively to the different master processing circuits, wherein each of the plurality of I/O units includes: the plurality of preceding-stage terminals (30) configured to be connected to the master unit provided in the preceding stage of the I/O unit or to another I/O unit provided in the preceding stage; the plurality of subsequent-stage terminals (32) configured to be connected to another I/O unit provided in the subsequent stage of the I/O unit, the subsequent-stage terminals being connected respectively to the different preceding-stage terminals; and the slave processing circuit (26) connected to one preceding-stage terminal among the plurality of preceding-stage terminals and to a subsequent-stage terminal among the subsequent-stage terminals that is connected to the one preceding-stage terminal, the slave processing circuit being configured to perform signal processing, and wherein the plurality of I/O units include: the plurality of first I/O units (14A) the slave processing circuits of which are connected to the first master processing circuit of the master processing circuits; and the plurality of second I/O units (14B) the slave processing circuits of which are connected to the second master processing circuit of the master processing circuits that is different from the first master processing circuit.

This provides a communication system which allows an I/O unit to be easily added within a station.

The first master processing circuit may be a redundant circuit of the second master processing circuit. This improves the security and reliability of the communication system.

Each of the plurality of I/O units may further include the interface (28) configured to connect the slave processing circuit and the device and allow the slave processing circuit to perform input and output of a signal with respect to the device.

The invention claimed is:

1. An I/O unit that connects a master unit including a master processing circuit and a device and transmits a signal between the master unit and the device, the I/O unit comprising:

a plurality of preceding-stage terminals configured to be connected to the master unit provided in a preceding stage of the I/O unit or to another I/O unit provided in the preceding stage;

a plurality of subsequent-stage terminals configured to be connected to another I/O unit provided in a subsequent stage of the I/O unit, the subsequent-stage terminals being connected respectively to the different preceding-stage terminals; and a slave processing circuit connected to a first preceding-stage terminal among the plurality of preceding-stage terminals and to a subsequent-stage terminal among the subsequent-stage terminals that is connected to the first preceding-stage terminal, the slave processing circuit being configured to perform signal processing, wherein the first preceding-stage terminal and a second preceding-stage terminal among the plurality of preceding-stage terminals are connected respectively to different master processing circuits.

2. The I/O unit according to claim 1, further comprising a selection circuit configured to select a combination of the plurality of preceding-stage terminals and the plurality of subsequent-stage terminals which are connected to each other.

3. The I/O unit according to claim 1, wherein the master processing circuit connected to the first preceding-stage terminal and the master processing circuit connected to the second preceding-stage terminal are provided in the same master unit.

4. The I/O unit according to claim 3, wherein the preceding-stage terminal and the subsequent-stage terminal connected to the slave processing circuit are connected to each other via the slave processing circuit.

5. The I/O unit according to claim 1, further comprising an interface configured to connect the slave processing circuit and the device and allow the slave processing circuit to perform input and output of a signal with respect to the device.

6. A communication system comprising a master unit and a plurality of I/O units connected to the master unit and configured to transmit a signal between the master unit and a device, wherein the master unit includes:

a plurality of master processing circuits configured to perform signal processing; and a plurality of branch-line terminals connected respectively to the different master processing circuits, wherein each of the plurality of I/O units includes:

a plurality of preceding-stage terminals configured to be connected to the master unit provided in a preceding stage of the I/O unit or to another I/O unit provided in the preceding stage;

a plurality of subsequent-stage terminals configured to be connected to another I/O unit provided in a subsequent stage of the I/O unit, the subsequent-stage terminals being connected respectively to the different preceding-stage terminals; and a slave processing circuit connected to the first preceding-stage terminal among the plurality of preceding-stage terminals and to a subsequent-stage terminal among the subsequent-stage terminals that is connected to the first preceding-stage terminal, the slave processing circuit being configured to perform signal processing, and wherein in each of the plurality of I/O units, the first preceding-stage terminal and the second preceding-stage terminal of the plurality of preceding-stage terminals are connected respectively to different master processing circuits, the plurality of I/O units include:

a plurality of first I/O units the slave processing circuits of which are connected to a first master processing circuit of the master processing circuits; and a plurality of second I/O units the slave processing circuits of which are connected to a second master processing circuit of the master processing circuits that is different from the first master processing circuit.

7. The communication system according to claim 6, wherein the first master processing circuit is a redundant circuit of the second master processing circuit.

8. The communication system according to claim 6, wherein each of the plurality of I/O units further includes an interface configured to connect the slave processing circuit and the device and allow the slave processing circuit to perform input and output of a signal with respect to the device.

* * * * *